United States Patent [19]

Wood et al.

[11] Patent Number: 5,724,241
[45] Date of Patent: Mar. 3, 1998

[54] DISTRIBUTED SEISMIC DATA-GATHERING SYSTEM

[75] Inventors: George William Wood, Sugar Land; Ricky Lynn Workman, Houston; Michael W. Norris, Cypress, all of Tex.

[73] Assignee: Western Atlas International, Inc., Houston, Tex.

[21] Appl. No.: 585,244

[22] Filed: Jan. 11, 1996

[51] Int. Cl.$^6$ ............................................. G06F 19/00
[52] U.S. Cl. ............................................. 364/421
[58] Field of Search ..................... 364/420, 421, 364/422; 395/929

[56] References Cited

U.S. PATENT DOCUMENTS

| | | | |
|---|---|---|---|
| 556,546 | 1/1896 | Wisecup | 364/421 |
| 3,946,357 | 3/1976 | Weinstein et al. | 340/15.5 |
| 4,281,403 | 7/1981 | Siems et al. | 367/76 |
| 4,589,100 | 5/1986 | Savit | 367/77 |
| 4,639,901 | 1/1987 | Warmack et al. | 367/13 |
| 4,674,068 | 6/1987 | Carruth, Jr. | 364/421 |
| 4,725,992 | 2/1988 | McNatt et al. | 364/421 |
| 4,879,696 | 11/1989 | Kostelnicek et al. | 367/76 |
| 4,885,724 | 12/1989 | Read et al. | 364/421 |
| 4,970,696 | 11/1990 | Crews et al. | 364/421 |
| 5,416,750 | 5/1995 | Doyen et al. | 367/73 |
| 5,650,981 | 7/1997 | Jacobsen et al. | 364/421 |

OTHER PUBLICATIONS

Lapucha et al., "Application Of On-The-Fly Kinematic GPS To Seismic Surveying", IEEE 1994 Position Location and Navigation Symposium, pp. 555-561, Apr. 1994.

McLellan et al., "GPS/Barometry Height-Aided Positioning System", IEEE 1994 Postion Location and Navigation Symposium, pp. 369-375, Apr. 1994.

"High Performance Seismic Trace Compression", P.L. Donoho, R.A. Ergas, Chevron Petroleum Technology Company and J.D. Villasenor, Dept. of Electrical Engineering, U.C.L.A., 5 pages.

SEDIS 2-Digital Seismic Station Brochure, "A Compact Seismic Digital Station for Wide Angle Reflection and Seismicity Studies", GeoPro GmbH, Hamburg, Germany, 10 pages.

Primary Examiner—Donald E. McElheny, Jr.
Attorney, Agent, or Firm—William A. Knox

[57] ABSTRACT

A distributed seismic data acquisition system includes a vast plurality of Autonomous Data Acquisition Modules (ADAM) to each of which are interconnected a subplurality of data-collection channels. Each data collection channel is comprised of an array of seismic sensors for continuously measuring seismic signals. The ADAMs include a GPS satellite receiver for providing geographic coordinates and system clock. Measured seismic signals are quantized and continuously downloaded to the respective interconnected ADAMs from the data-collection channels. The system includes both field testing capability as well means for transmitting the results of self tests. Provision is made for servicing the ADAMs at the end of a multi-day recording session and for harvesting and cataloging the recorded data. The seismic signals gathered by use of the distributed data-gathering system may be processed to provide a subsurface earth model.

6 Claims, 4 Drawing Sheets

5,724,241

DISTRIBUTED SEISMIC DATA-GATHERING SYSTEM

BACKGROUND OF THE INVENTION

1. Field of the Invention

This invention is concerned with a system for precision monitoring of the locations of areally-distributed, unattended seismic data acquisition modules, for synchronizing the functional operation of the modules and for harvesting the acquired data to provide a model of the subsurface.

2. Discussion of Related Art

Seismic surveys are conducted for the purpose of investigating and modeling the depth and structure of subsurface earth formations as a preliminary activity in exploiting natural resources. Although the concepts of this teaching may be applied beneficially to marine exploration, this disclosure is presently considered preferably applicable to land operations and especially with respect to seismic surveys in remote, sparsely-populated regions.

During the course of reflection seismometry, a source, emplaced at or near the surface of the earth, radiates an acoustic wavefield. The wavefield may be created by an impulsive source, by a chirp-signal generator or any other means now known or unknown. The wavefield propagates downwardly into the earth to insonify the earth strata below. The wavefield is reflected from the respective subsurface strata back to the surface where the mechanical motions of the seismic waves are converted to electrical signals by seismic sensors such as geophones or accelerometers. The received, reflected seismic signals may be recorded and processed by means well known to the art such as by a computer, to provide and display a multi-dimensional model of the earth's subsurface.

Seismic studies may be performed in one dimension to provide a single time-scale trace exhibiting a desired seismic parameter as a simple function of time (or depth if the propagation velocity of seismic waves is known). The data are generated using a substantially single source and a substantially single sensor which may be, for example lowered to various levels in a borehole as in vertical seismic profiling (VSP).

Seismic surveys may be conducted in two dimensions (2-D) wherein a plurality of sensors, such as for example, 100, are distributed at spaced-apart intervals, commonly known to the industry as a spread, along a designated line of survey at or near the surface of the earth. Each sensor or compact group of several interconnected sensors is coupled by a signal transmission means to a dedicated signal-conditioning and recording channel. The signal transmission means may be a wireline, an optical waveguide, or an ethereal communication channel. A source radiates a wavefield (fires a shot). During a listening period that may extend from six to perhaps, 20 or more seconds, the respective seismic sensors receive the wavefield after reflection from the earth formations below. The electrical signals resulting from the reflected waveforms may be recorded, processed and formatted as a plurality of time-scale traces. The time-scale traces provide an analog of a cross section of the earth along a single vertical plane having the dimensions of reflection travel time vertically, and offset distance horizontally. After each shot, source and sensors are progressively advanced along the line of survey by a preselected incremental distance until the entire length of the survey line has been occupied.

Three dimensional (3-D) surveys may be conducted wherein many hundreds or thousands of seismic sensors are distributed areally over an extended region in a grid pattern of sensor stations established with reference to north and east geographic coordinates. Typical grid dimensions might be on the order of 50×100 meters. A 3-D survey is capable of providing a model of a volumetric cube of the sub-surface earth strata. Each sensor or sensor group is connected to a single recording channel. Each time that a source is fired, it insonifes a large patch of sensors. After each firing, the source moves to a new location where the firing is repeated.

The total number of sensor channels that can be accommodated at any one source firing depends upon the number of separate data-recording channels available. A limiting factor is, of course the physical space available in a realizable central recording station as well as the number of cables required if physical data-transmission channels are used. In a large 3-D operation, a wireline network of 60 kilometers of multiconductor cable is not unusual.

Three dimensional data acquisition systems depend upon real-time transmission of the seismic data through a multichannel telemetric system. All of the data are recorded and partially preprocessed at a central, operator-occupied field recording station, usually truck-mounted. Customarily, the sensors and interconnecting cables are laid out well in advance of the appearance of the central station and source equipment. The cables and sensors may remain unattended in the open for many days, during the interim being subject to theft and serious damage by man or beast. Cattle and selected rodents have a taste for certain brands of cable insulation. Indigenous natives have been known to steal surveyors' station-marking flags for decorating their hogans.

As 3-D operational demands increase to several thousand sensors, the logistical problems posed by the massive quantities of required data-transmission cabling are horrendous. Not only must the field emplacement engineers deploy many tens of miles of cable, the integrity of those cables must be verified and corrected as needed. Furthermore, prior to actual recording of data, the seismic sensors and their ancillary instrumentation must be shown to be free of signal distortion and noise. The term "noise" includes any unwanted signal transient. Quality control is an essential requirement.

Cables can be eliminated of course, by use of an RF telemetric system. There are a number of problems in that it is often difficult to license the number of channels needed to service the myriads of sensors in a 3-D survey. Another serious problem is that RF transmissions are easily blocked by obstructing terrain and vegetation, particularly jungles and heavily forested areas so that ethereal telemetric methods become unreliable in certain regions of the earth.

A cableless system was proposed by D. H. Weinstein et al. in U.S. Pat. No. 3,946,357, issued Mar. 23, 1976. In this proposal, a few seismic sensors, such as 8, are connected by short wirelines to a geophone monitoring means. Under radio control, a source fires a shot and the respective geophone monitoring means are commanded to record data in a storage device in the monitoring means. In that patent it is contemplated that a plurality of shots are fired and that the seismic signals received by the geophones after each shot will be summed and the summed signals are later transferred to a tape recorder for archival storage. The problem with that system is the need for radio control which, as above intimated is not always very reliable. There is no provision for real-time quality-control (QC) of the recorded data. The system apparently has but limited data-storage capacity and field-summation of data often is not acceptable. Furthermore, the exact locations of the seismic sensors are not monitored.

U.S. Pat. No. 4,281,403, issued Jul. 28, 1981 to Lee Siems et al., teaches deployment of data acquisition modules that are incommunicado with respect to a central control unit and the acoustic source. Each data acquisition unit (DAU) is provided with a local clock and a seismic-signal storage means such as a magnetic tape cassette. At preselected timed intervals, the local clocks cause the source to fire a shot and the DAUs to wake up and tape-record data. At the end of the day, the tapes are harvested. Accurate synchronization of the source with the DAUs depends upon accurate knowledge of the drift rate of the respective local clocks. To that end, the local clocks are synchronized to a master clock at the beginning and at the end of a recording work period. The so determined drift rate is linearly prorated over the recordings made during the work period. The system turned out to be impractical because of erratic clock drift rates. There was no provision for QC and the data-storage capacity was limited to about one day's shooting.

J. W. Farmer in U.S. Pat. No. 4,885,724 issued Dec. 5, 1989 teaches a seismic sensor that is connected to a remotely-deployed, radio-controlled, portable recorder which contains circuitry for sampling, digitizing, processing, storing and recording seismic-trace data. Coded radio signals instruct each recorder to commence an operation or sequence of operations from a predetermined set of programmed instructions stored in a program read-only memory included in each recorder. Such operations include seismic-trace data acquisition, optional weighting and vertical stacking, normalization and seismic source initialization. Each module appears to service a single sensor or interconnected sensor group.

U.S. Pat. No. 4,639,901, issued Jan. 27, 1987 to R. E. Wormack et al., a companion patent to the '724 patent above, teaches QC methods under preselected program control. Seismic data are recorded on cassette tape cartridges which have but limited storage capacity. The recorder tests are confined to transmitting a first radio signal, receiving, weighting, processing and recording same. Subsequently transmitting a second test signal, receiving, weighting, processing and stacking the first and second test signal. The stacked signals are then reproduced for indicating the operability of the system. Both of the above systems suffer from the need for radio control of a recording cycle. As before explained, radio control is not always reliable.

A method employing remote distributed recorders that does not rely on radio transmissions is taught by U.S. Pat. No. 4,879,696, issued Nov. 7, 1989 to R. J. Kostelnicek. In this method, a coded acoustic signal propagates from a source to a recording module. At the recording module, a precursor wavefield such as the air wave or the near-surface refracted wave is cross correlated in a microprocessor with a preselected correlating signal. If the correlation in valid, the remote recorder wakes up to thereupon record and store seismic data. The capacity of the data storage means is not mentioned. No means for QC is provided. A local clock is used for timing synchronization in the same manner as the '403 patent above referenced. Unless the signal-to-noise ratio is superior, acoustic triggering proved to be unreliable.

It is of interest that none of the above references provide means for verifying the geographic location of the remote DAUs. U.S. Pat. No. 4,589,100, issued May 13, 1986 to C. H. Savit describes a means for using GPS satellites to determine the position of a central station. The approximate differential locations of remote recording units relative to the central station are determined by use of selected portions of the electromagnetic signals emanating from one or more satellites. This system does not provide for QC and relies on a local clock for operation as taught by the '403 patent. The data storage capacity and endurance was very limited.

GeoPro GmbH of Hamburg, Germany, provides a mobile stand-alone digital seismic station, dubbed SEDIS 2. The system is designed to record six channels of data continuously for many days. Alternatively it may be programmed to record data at selected intervals or it may be event-triggered such as for earthquake-monitoring applications. The SEDIS 2 derives its time base and positioning information from GPS satellites. There apparently is no provision for monitoring the integrity of the instrumentation. Although the location of the seismic station itself is determinable from satellite transmissions, no provision is made to incorporate the locations of the individual seismic sensors coupled to the respective data channels. That is an important consideration because the sensors may be 50–100 meters distant from the seismic station and from each other.

Seismic data accumulated from thousands of sensors over a moderate recording-time period of several days may amount to many terabytes. To reduce the volume of the dataset to manageable proportions, data compression technology may be invoked. One such method that achieves a nearly lossless 10:1 data compression is outlined in U.S. patent application Ser. No. 08/557,617, docket number AW-9533 in the name of Xuguong Li and assigned to the assignee of this invention. In that Application, a modified version of a Discrete Wavelet Transform technique is involved and applied to downhole seismic operations.

P. L. Donaho et al. in a paper entitled *High Performance Seismic Trace Compression* discuss application of discrete wavelet transforms for compressing seismic data from extended 3D seismic exploration systems.

There is a need for a large, distributed, integrated seismic data-gathering system employing myriads of autonomous stand-alone data acquisition modules, to each of which is coupled a plurality of separate data-collection channels or sensor arrays. The precise locations of both the data acquisition modules as well as the individual arrays must be known accurately. The system clocks resident in each data acquisition module must be synchronized within microseconds. The integrity of the instrumentation in the respective remote autonomous modules and sensor arrays must be verifiable in real time on the basis of a statistical sampling of the modules as distributed. An efficient capability is to be furnished for servicing the modules and for harvesting and processing the accumulated seismic data therefrom.

SUMMARY OF THE INVENTION

The data gathering system of this invention provides a first plurality of seismic signal collection channels for continuously measuring seismic signals. The signal-collection channels are interconnected in order of channel number with a data acquisition module to form the basic building block of a distributed seismic data-gathering system over a region of interest.

A GPS satellite receiver is integral with the data-acquisition module for monitoring the geographic coordinates thereof and for establishing a system clock synchronized to the satellite time base transmissions.

Each data-collection channel includes means for accepting utility data which includes externally-derived geographic coordinates, channel identification indicia and the instrumental configuration settings that characterize each channel. The individual channels include well-known means for sampling and quantizing the continuously measured seismic signals at preselected timed sample intervals during a predetermined signal-collecting time window. The measured, sampled and quantized seismic signals and the utility data are downloaded to the data acquisition module interconnected therewith. The downloaded measured quantized seismic signal samples as well as the utility data are recorded in sample-sequential order by channel number on a selected storage medium.

An additional feature of this invention includes a means for accepting a plurality of data acquisition modules en banc for servicing and for transcribing the recorded seismic data from sample-sequential order by channel number to channel-sequential order by sample number as time-scale data blocks. The time scale data blocks are assembled and recorded on modularized storage media and filed in a robotic library, catalogued in accordance with the geographic coordinates of origin of the time-scale data blocks recorded thereon.

This invention also includes a computer programmed for extracting selected time scale data blocks from the robotic library and providing a model of the structural features of subsurface strata beneath the region encompassing the distributed data-acquisition modules.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Array Distribution

Figure 1:
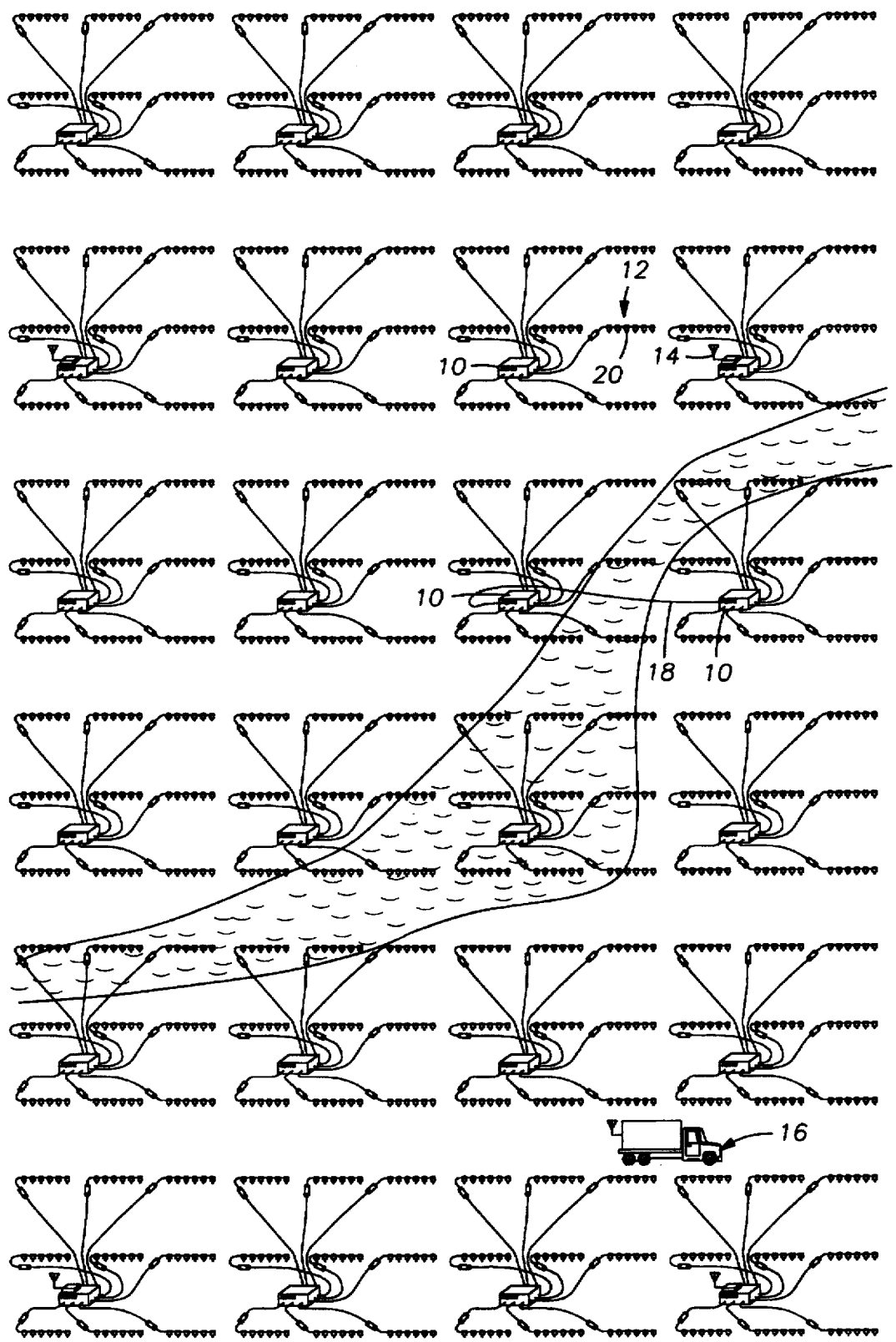
FIG. 1 is a plan view of the layout instrumentation for a large-area seismic survey 3-D.

FIG. 1 illustrates a plan view of a proposed distribution of a plurality of autonomous data acquisition modules (ADAMs). Each box such as 10 represents an ADAM. Reference number 12 represents a sensor array made up of several interconnected snesors 20. As will be shown later, preferably nine arrays or sensor groups, which are hereinafter referred to variously as "channels", or "data-collection channels" are electrically interconnected to any one ADAM. Nine channels are preferable but more or fewer may be used.

The spacing between arrays is typically 50 meters; that between the ADAMs is 150 meters although other dimensions are not ruled out. Some of the ADAMs may be equipped with RF transmitters, indicated by a radio antenna symbol 14, for transmitting QC information to a central station to be described later. It is preferable that sufficient radio-equipped QC units be provided to provide statistical assurance, at a desired confidence level, of operational integrity. The QC units should be placed in a manner to avoid known radio-transmission shadows. They may also be concentrated around regions known to the unusually hazardous or noisy such as around heavily populated areas.

Each ADAM incorporates a GPS satellite receiver (not shown) for providing geographic coordinates and timing information. In the presence of an obstruction, such as a river (shaded region), the ADAMs may be physically coupled together to facilitate safe removal. Although submerged ADAMs are completely autonomous and water proof, the GPS receivers become dysfunctional underwater. In that circumstance, although satellite positional information is not available, timing information is preferably transmitted to the submerged ADAMs by an interconnecting wireline, such as shown at 18, from a module that happens to be in the open air.

The system as a whole in under the control of a central mobile System Management Station, 16, to be explained in detail later. Since system operation, other than QC, requires no necessary physical, electrical or ethereal connection between the System Management Station, 16, and the ADAMs, Station 16 may be put anywhere in the region of survey that is convenient.

Autonomous Data Acquisition Module (ADAM)

Figure 2:
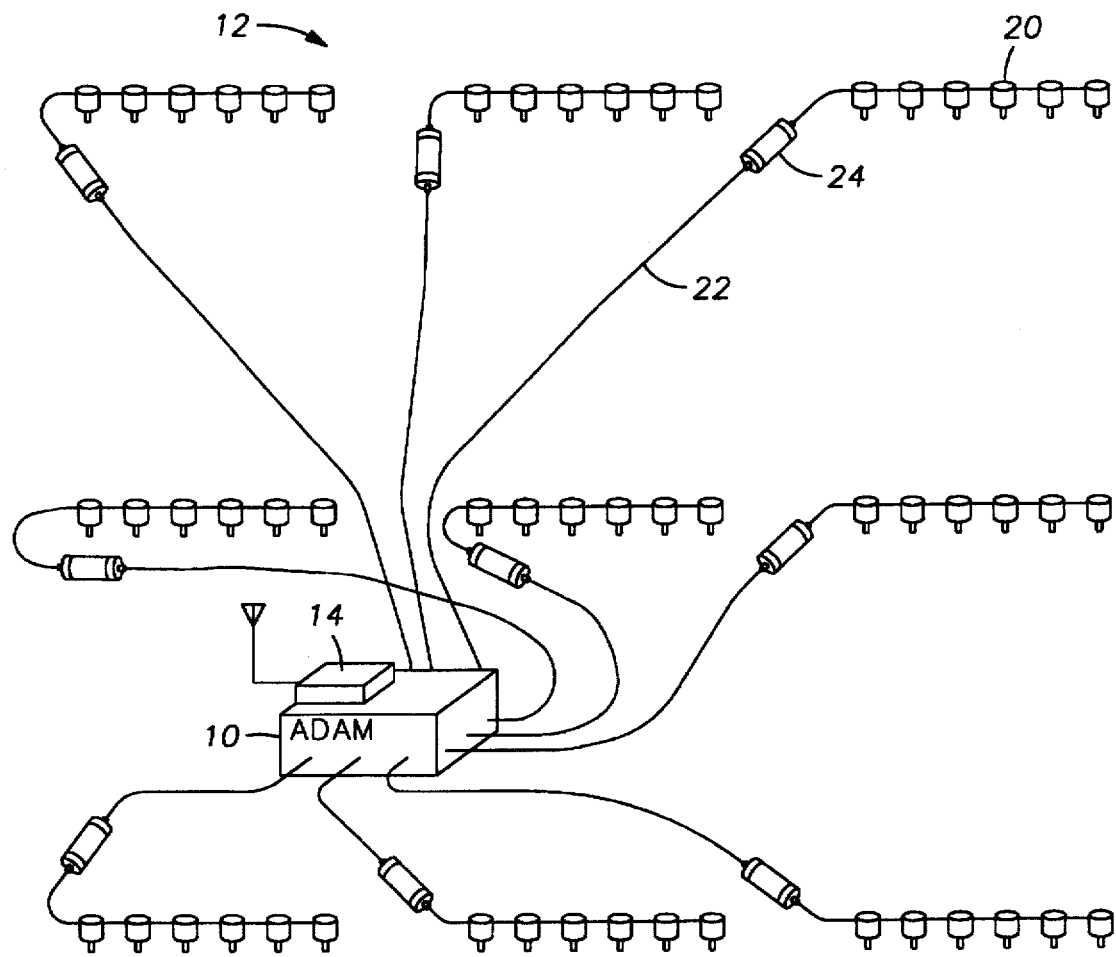
FIG. 2 shows the arrangement of an autonomous data acquisition module with respect to the seismic sensor arrays that constitute the data-collection channels and ancillary support equipment.

Please refer now to FIG. 2 where there is shown an ADAM to which are connected nine data-collection channels such as 12. Each data-collection channel includes an array of six sensors each, such as 20, although more or fewer may be used. The sensors comprising each array may preferably be connected for example, in series-parallel, 10 meters apart, on 50-meter lead-ins, such as 22 to the ADAM. A miniaturized group digitizer module 24 (GDM), integral with the lead-in cable 22 of the channel under consideration, interfaces the sensors with the ADAM. The GDM, 24, receives analog signals from the sensors, samples and filters the signals in the usual manner, automatically applies a gain value to the signals to maintain the signal amplitude within a preselected range relative to full scale and quantizes the gain-conditioned analog signal samples as digital data words, all in conformance with means and methods well known to the art. The digital data words are downloaded to the ADAM where they are recorded. Each GDM includes a non-volatile RAM for receiving externally-derived, manually-entered GPS positioning parameters appropriate to the corresponding data channel and for downloading that position to the ADAM. Power, commands and clocking information for each GDM are furnished by the associated ADAM to which the channel is connected.

At preselected sample intervals during a signal-collecting time window and upon receipt of a clock pulse from its interconnected ADAM, each data-collection channel downloads a 32 bit data word which includes 2 start bits, a quantized seismic signal sample with 24 bits of resolution, a parity bit, 3 status bits (power fault, overdrive, logic fault) and 2 stop bits. A utility word is downloaded from each channel at the end of every signal-collecting time window, interlayed between normal data samples. The utility word includes the externally-derived geographic coordinates of the actual location of the sensor array, channel identification indicia such as survey line and flag numbers, and instrumental configuration settings such as filter passband, preamplifier gain setting, test-switch positions and status bits.

The ADAM is the control center for the interconnected seismic data-collection channels. The ADAM is a lightweight, person-portable module that is about ⅓ meter square and about 15 centimeters thick, weighing about 4 kg.

An ADAM, 10, and interconnected group digitizer modules such as 24 may be powered by batteries that are trickle charged by conventional solar cells (not shown) of any well known kind. The batteries, such as Power Sonic PS-12280, 12 v, have an endurance of 28 A/h, good for least one week of continuous data recording without recharging on the basis of exemplary 12-hour work days.

Seismic data transmitted from the sensors via the GDMs, are preferably continuously recorded in 16-second signal-collecting time windows, although longer or shorter time windows may be employed as desired. The recorded data are multiplexed in sample-sequential order by channel number. The data are recorded preferably on a hard disk of any desired type having a multi-gigabyte capacity although any other suitable recording medium presently known or unknown may be substituted. It is contemplated that the data are to be recorded in compressed format such as by means of a Discrete Wavelet Transformation such as taught by patent application Ser. No. (WG-95-10) previously discussed, or any other desired method of compression. For that purpose, a microprocessor may be installed in the data stream. The data recorder has a capacity of retaining at least a one-week, or more, harvest of data before unloading.

A key feature of the ADAM module is the use of differential positioning using transmissions from the GPS satellite constellation and using the precision satellite time base as the system clock for system event-synchronization. The position of each sensor array corresponding to each data-collection channel is manually entered into the corresponding GDM and is downloaded to the ADAM as previously stated. The array position is derived and entered from a person-portable group-deployment tester (GDT) to be described later.

As before stated, the ADAM itself includes its own integral GPS receiver and continuously monitors and records its own current position independently of the sensor array positions. The ADAM also incorporates the satellite time base as a system clock to provide precise system timing, synchronization with other ADAMs and with the firing of the seismic source(s).

An ADAM may include an anti-theft device and a RF beeper transmitter for tracking if the ADAM should rise up and wander away. One such device might be a modified version of the ELT (emergency locator transmitter) that is commonly found in small airplanes.

In operation, as above suggested, the ADAM receives and stores data continuously during data-collection time windows or recording frame of some desired length as determined by precision satellite timing. Although it is convenient to fire a source at a recording-frame time boundary, the actual time that the first-arriving signals appear at a given array depends on its offset from the source. Therefore, the seismic signals resulting from any one source-firing may be spread over more than one recording frame. Thus, means are provided for identifying the sequence ident of each source firing such as the time and Julian date from satellite transmissions which may be recorded in the header of each record.

Group Deployment Tester (GDT)

Figure 3:
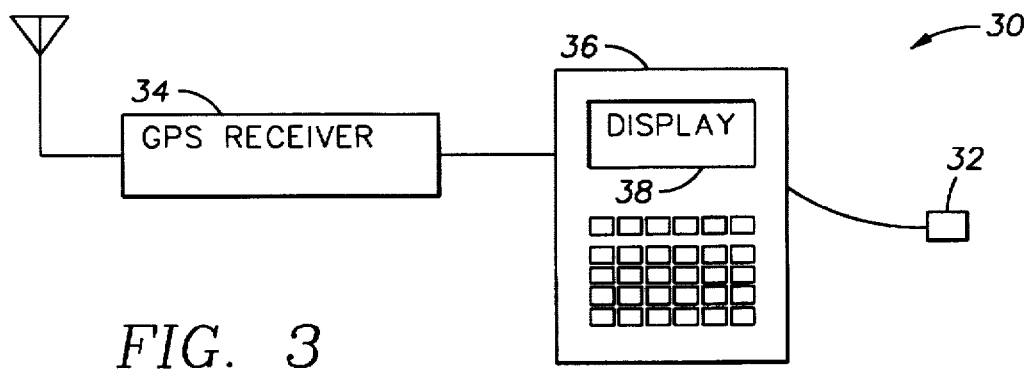
FIG. 3 is a functional diagram of a group deployment tester.

After an ADAM and its interconnected data-collection channels have been laid out by the system emplacement engineers, a person-portable Group Deployment Tester, 30, FIG. 3, is connected in turn, by plug 32 to each of the GDMs, 24. The Tester, shown schematically in FIG. 3, includes a GPS satellite receiver, 34, operating in the differential mode in combination with a similar unit in the System Management Station, for inputting the sensor-array position to the memory of the GDM. The Tester, 30, also includes a keyboard, 36, or the like, for manual input of identification indicia such as the proposed or preplot location and the data-observation station identification number or symbol. Geographic data are downloaded from the GDM, 24, to the appropriate ADAM storage area. The Tester additionally provides and may display on a small monitor screen 38, quantitative information about the GDM instrumentation such as harmonic distortion in %, K-gain accuracy, common mode rejection, offset rejection and pulse response in terms of amplitude, phase shift and damping. Sensor tests include continuity, leakage, DC resistance, harmonic distortion, pulse response in terms of amplitude, phase shift, frequency-response and damping. Testing is automatic on a go/no-go basis such that a defective sensor and/or GDM may replaced before departure of the emplacement engineers for the next station to be deployed.

Radio Frequency Quality Control (RFQC)

The ADAMs are dispersed over a large area. It may be many days before being put to use. Despite exhaustive field tests by the field emplacement engineers, untoward happenings may have occurred subsequent to deployment of the instrumentation and prior to shooting. Furthermore, even though the instrumentation is properly functional, environmental conditions such as noise level or other transient events may adversely affect the ADAMs. Therefore a Quality Control (QC) means, such as the RFQC device 14 shown in FIG. 2 in association with the ADAM is provided for transmitting to a Systems Management Station the operational status of the ADAMs distributed over the survey region. From a practical standpoint, it would be most difficult to attempt to critically examine the operational status of every one of several thousand ADAMs in real time. Therefore monitoring the integrity of a statistical sample to a desired confidence level, selected from the total population of the distributed ADAMs, is contemplated.

Diagnostic self tests are compiled and transmitted upon radio command to the Systems Management Station by a radio transmitter dedicated to quality control (RFQC Unit 14). As earlier pointed out, radio transmissions may be erratic. Although radio traansmission is not desirable for sending real data, the QC requirements are not so critical. As many RFQC Units are deployed as required to provide a statistical assurance to a desired confidence level that the system components on the whole are properly operative. The RFQC Units are independent of the ADAMs and include their own power supplies but they are preferably adapted to be connected to an ADAM for QC purposes. The format of the Status block that is transmitted to the System Management Station is shown in the table below:

|  | Description | Bytes |
| --- | --- | --- |
| Std | Box Address/Serial Number | 4 |
| Optional | Current clock time | 6 |
| Std | FSID of most recent record | 4 |
| Std | Time of most recent record | 8 |
| Optional | Maximum RMS signal in last record (in 1ny 100 ms window) | 2 |
| Optional | Minimum RMS signal in last record (in any 100 ms window) | 2 |
| Std | Battery Voltage | 1 |
| Std | Faults (continuity out of range, logic fault, GDM fault, overdrives, excessive power line noise) | 2 |
| Std | Disk status (% full) | 1 |

-continued

| | Description | Bytes |
|---|---|---|
| Optional | Power Supply voltage readings | 3 |
| Optional | Compressed seismic data from 1–9 channels | 256–2048 |
| Optional | Internal test results for group and seismic channel (continuity, geophone motional impedance, crossfeed, equivalent input noise, harmonic distortion, etc.) | 64 |
| Optional | Diagnostic Test Results | 64 |

A very large number of RFQC Units may be deployed, each requiring a separate appropriate communication channel. Therefore QC information preferably is transmitted to the Systems Management Station using well-known spread-spectrum modulation technology. That method provides a nearly infinite number of radio transmission channels so that conventional commercial radio communication channels are not usurped.

System Management Station

Figure 4:
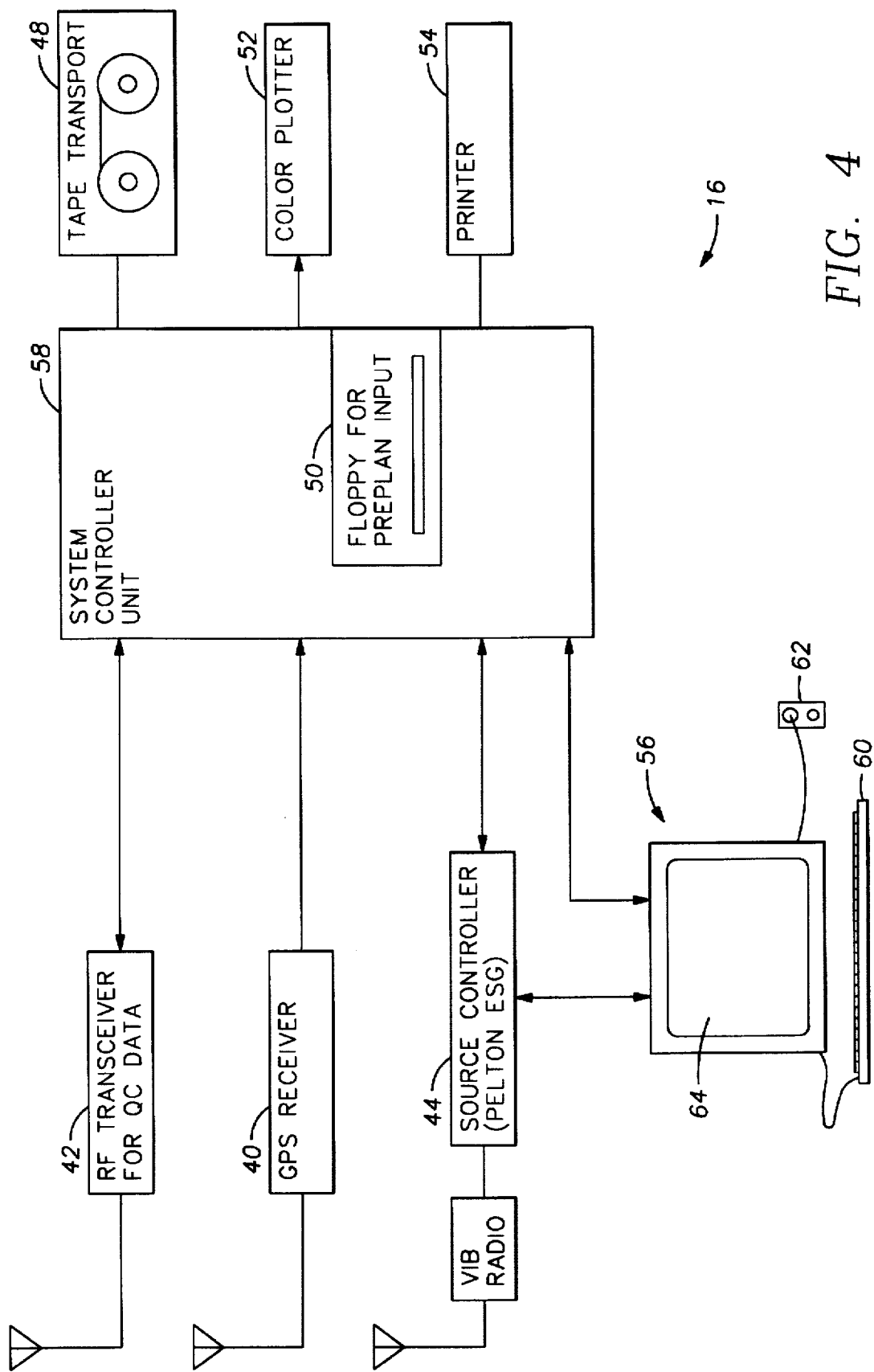
FIG. 4 is a functional diagram of a system management station.

FIG. 4 is a schematic diagram of a System Management Station which may be vehicle-mounted for portability. It includes up to three radios: A GPS receiver, 42, for use in differential location of the respective ADAMs and arrays, a RF transceiver, 44, for communication with the RFQC units and it may include a Source-control transmitter, 46, for activating an acoustic wavefield-radiating device such as a chirp-signal generator or impulsive sources including air guns, electrical discharges, implosive, explosive or impactive devices.

A tape transport, 48, such as an IBM 3480 or any other high speed, high volume recording means, preferably digital, now known or unknown, provides archival storage for time and housekeeping information for each shot, selected QC information from the remote sensors, updated preplan output, operators' daily diary and operational notes. The proposed preplan of the geographic station and sensor-group distribution may be input from a tape cassette or from a floppy disk, 50. Ancillary printer, 52 and plotter, 54, of any desired type may be provided to furnish hard copy of operational details.

All of the above recited facilities are monitored and controlled by an operator control station, 56, through an interface logic unit, 58 which may include a programmed general purpose digital computer of any well-known type for coordinating activities. A keyboard, 60, or optional mouse, 62, are provided for manual input of data and operational commands. The usual visual display monitor, 64 of any desired type is furnished. Displays may include: 1) A geographic location map of the ADAMs and sensors versus the original proposed preplanned sensor distribution; 2) A live display of the noise level of all, or of selected ones of the sensors in the area; 3) A map of the maximum recorded signal attributable to each channel displayed in living color. An important feature is automatic analysis of the incoming QC data from the hundreds of deployed RFQC units with means for flagging unacceptable ADAMs and/or sensor groups.

Transcription and Processing System (TAPS)

Figure 5:
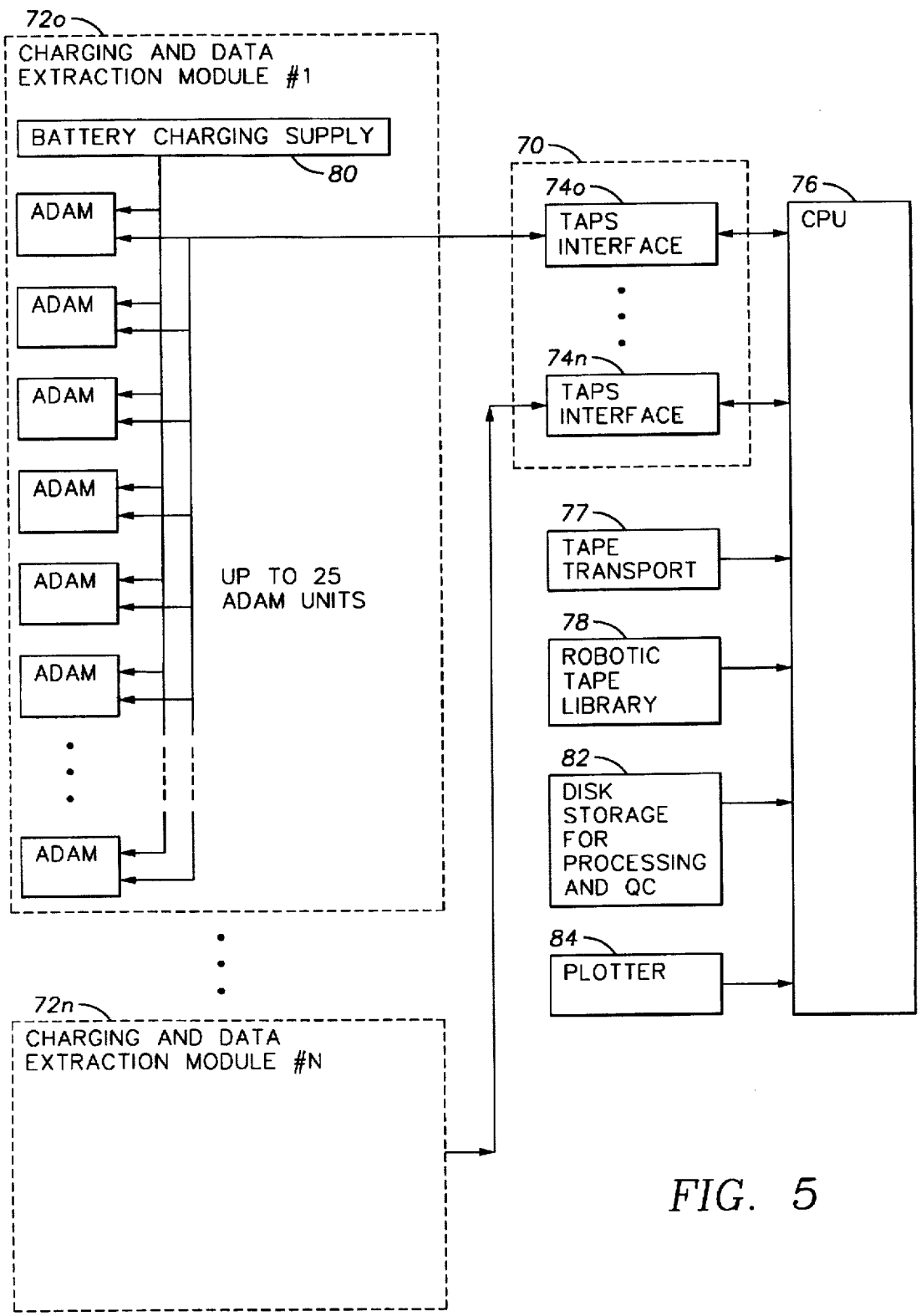
FIG. 5 is a block diagram of the system data-transcription, data-logging and module-servicing unit.

All of the above steps are concerned with data gathering. The data so gathered must be harvested at the end of some designated operational period which may be days or even weeks after commencement of the original field work. To that end, the field emplacement engineers disconnect and remove the sensor arrays to storage. The ADAMs are collected and returned to an operations base station, which may be a semi-fixed installation, where the ADAMs are coupled for servicing and data harvesting, to a Transcription and Processing System (TAPS) now to be described in connection with FIG. 5.

The Transcription and Processing System, generally shown as 70, consists of five primary components:

1) A bank of data-extraction and battery charging modules such as $72_0$–$72_n$ for receiving and interconnecting the ADAMs en banc 2) An interface unit, $74_0$–$74_n$, associated with each data extraction module, $72_i$, for interfacing the ADAMs' output data with a CPU 76.

3) The CPU (central processing unit) 76 which may be a programmed computer, for receiving and reformatting extracted data in channel-sequential order by sample number, binning the channelized data from the respective ADAMs according to geographic location and archivally storing the preprocessed data on modularized storage media such as magnetic tape cassettes or any other preferred medium using tape transport 77 and for processing the transcribed quantized seismic signals.

4) A robotic tape library, 78, such as a multi-drive Model 3494 Tape Library Dataserver made by International Business Machines Inc., having a capacity of up to 7.2 terabytes, including the required additional modules for receiving, cataloging and warehousing the modular data storage media in accordance with the geographic location from which the recorded seismic data were originally derived.

5) A battery charger 80 for recharging the ADAM batteries.

Additional devices useful in preprocessing and later processing the harvested data include a mass disk storage device 82 of any desired type and a suitable graphics plotter 84.

It is contemplated that each Charging and Data Extraction Module will accommodate two dozen ADAMs at any one time for both data extraction and battery charging. Up to 32 modules, each including its dedicated TAPS interface, can be serviced by one CPU, for a total of 800 ADAMs per data harvest.

Modeling of Subsurface Earth Strata

The ultimate object of geophysical exploration is to provide and display a multi-dimensional model of earth layers beneath the surface in an area of economic interest. Computer 76 may be instructed to extract selected modularized storage media from robotic library 78. Using any well-known seismic data processing computer routine such as taught by U.S. Pat. No. 5,416,750 issued May 16, 1995 to Phillipe Doyen et al., assigned to the assignee of this invention and incorporated herein by reference, the computer CPU 76 is instructed to convert the quantized seismic signals, obtained using the previously-described apparatus, into a different state using a Monte Carlo statistical method to simulate the lithoclass spatial distribution to provide a 3-dimensional model of the lithology of subsurface earth strata beneath the area of survey.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A seismic data-gathering system comprising:
   a first plurality of seismic signal-collection channels, for continuously measuring seismic signals, interconnected by channel number with at least one data acquisition module;

a GPS satellite receiver integral with said data acquisition module for monitoring the geographic coordinates thereof and for establishing a system clock synchronized to satellite time-base transmissions;

each said data-collection channel including means, under program control from said data-acquisition module for a) accepting utility data including externally-derived geographic coordinates, channel-identification indicia and instrumental configuration settings characterizing each said channel, b) continuously sampling and quantizing the continuously-measured seismic signals at preselected timed sample intervals during a predetermined signal-collecting time window, and c) downloading the quantized measured seismic signals and utility data to the data acquisition module interconnected therewith; and means in the interconnected data-acquisition module for continuously receiving and recording on a storage medium, the downloaded quantized measured seismic signals in sample-sequential order by channel number and for recording said utility data.

2. The system as defined by claim 1, further comprising:

a second plurality of data acquisition modules, said second plurality of data acquisition modules being autonomous, distributed areally over a region of survey and each being interconnected with a first plurality of seismic signal-collection channels.

3. The system as defined by claim 2, comprising:

a central station;

means in said central station for receiving said second plurality of data acquisition modules en banc, said means for receiving including a) means for charging a power source internally mounted of each said data acquisition module, b) means for concurrently with step a), transcribing data previously recorded on the storage medium from each said data acquisition module in sample-sequential order by channel number, c) means for reformatting the transcribed data in channel-sequential order by sample number as time-scale data blocks, d) means for assembling and recording the transcribed reformatted time-scale data blocks on modularized storage media of any desired type, and e) means for filing said modularized storage media in a robotic library, said modularized storage media being cataloged in said robotic library in accordance with the geographic coordinates of origin of the time-scale data blocks recorded thereon.

4. The system as defined by claim 2, comprising:

means, in each said data-acquisition module for providing, upon command, a self-test capability for demonstrating the integrity of each said interconnected data-collection channel and the instrumentation incorporated in the data acquisition module, and means for automatically evaluating, recording, transmitting and displaying the results of the self-test monitoring operation to a central station at a desired statistical level of confidence.

5. The system as defined by claim 2, wherein:

said utility data are downloaded from each seismic signal-collection channel to the data acquisition module connected thereto at the end of a signal-collecting time window.

6. A method for modeling subsurface earth strata, comprising:

radiating a seismic wavefield into the earth from a preselected location within a region of interest;

using the apparatus defined by claim 3 for collecting, recording and assembling seismic-signal time-scale data blocks that result from wavefield radiation;

employing a seismic data-processing program of any desired type, instructing a digital computer to recover from said robotic library, selected modularized storage media and to convert the seismic-signal time-scale data blocks resident therein to a tangible multi-dimensional model representative of the characteristics of said subsurface earth strata beneath said region of interest.

* * * * *